Feb. 12, 1935.  V. G. APPLE  1,990,971
ELECTRIC BOOSTER BRAKE MECHANISM
Filed June 12, 1930
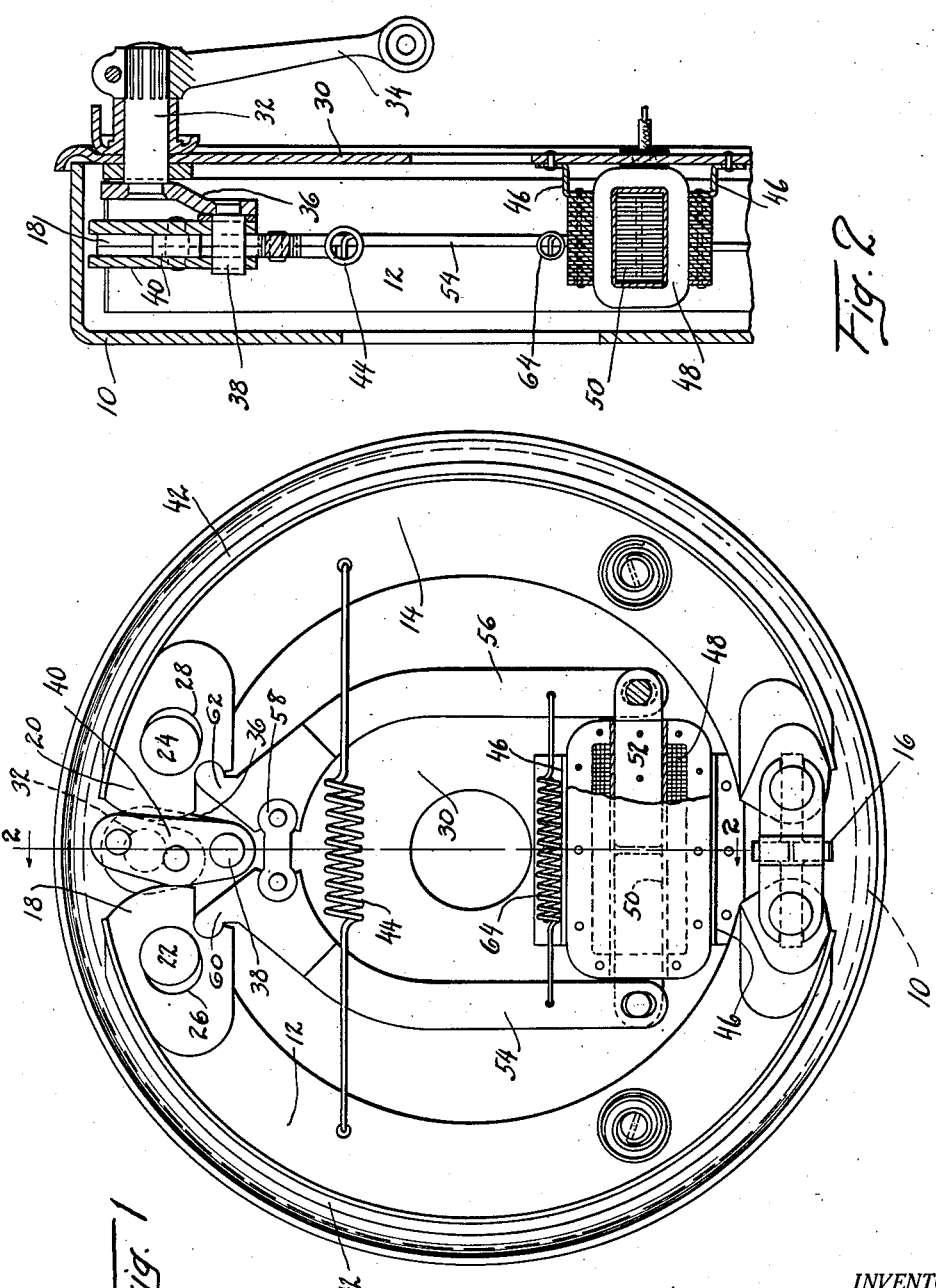
INVENTOR.
Vincent G. Apple
BY
ATTORNEYS Patented Feb. 12, 1935

1,990,971

UNITED STATES PATENT OFFICE 1,990,971

ELECTRIC BOOSTER BRAKE MECHANISM

Vincent G. Apple, Dayton, Ohio, assignor to Bendix Brake Company, South Bend, Ind., a corporation of Illinois Application June 12, 1930, Serial No. 460,723

12 Claims. (Cl. 188—156)

My invention relates to brake mechanism and has particular reference to brakes for automotive vehicles.

An object of my invention is to secure smooth and even braking action of the brake friction means against a revolving brake drum, and to obtain such smooth and even action by utilizing a compact independent unit in conjunction with each wheel brake whereby the brake friction means are expanded by electric power.

Another object of my invention is to so combine my electric power unit with the brake mechanism that a plurality of friction devices or members are urged with even, equal force against the drum while at the same time they are permitted an unequal range of movement.

I propose to accomplish this by providing a plurality of power arms, two being here shown, which are adapted to be operated simultaneously to expand a plurality of friction members, two being here shown, to apply an equal amount of power to each of the friction members urging them against the drum even though the extent of movement of each arm may be different, as by the shifting of the friction members due to the servo "wrapping" action of the shoes.

Various other objects and meritorious features of my invention will be apparent from the following description taken in conjunction with the drawing wherein:

Fig. 1 is a side elevation of the brake mechanism with a sectional view through the power mechanism, and Fig. 2 is a cross section through line 2—2 of Fig. 1.

Mounted within the rotatable brake drum 10 in well known fashion are the two brake shoes 12 and 14. The lower adjacent extremities of these shoes are connected by means of a screw adjusting member 16, while the upper adjacent extremities are each provided with a flange 18 and 20 which are free to move to a limited extent along the fixed studs 22 and 24 which extend through the slots 26 and 28.

Extending through the backing plate 30 is the stub shaft 32 of brake actuating arm 34. The inner extremity of the stub shaft 32 is provided with a radially extending arm 36, to one extremity of which is secured a stud 38. Pivotally mounted on this stud is a camming assembly 40 of the type generally used to operate the duoservo shoes here illustrated and which is described in detail in my copending application Serial No. 404,235, filed November 2, 1929. The cam faces of the assembly are adapted to bear against the flanges 18 or 20 to expand the shoes 12 and 14 and thus bring the brake lining 42 to bear against the inner periphery of drum 10. The usual retraction spring 44 connects the two shoes and functions to contract them to their inoperative position upon release of the brake operating arm 34.

Secured to the backing plate 30 by means of a bracket 46 is a solenoid coil 48. Two solenoid plungers 50 and 52 are slidable axially within the bore of the coil and to their outer extremities are secured the arms 54 and 56. Each of these arms is pivotally connected to a link 58 and each is provided with an upwardly extending lever arm 60 and 62 which is adapted to bear against a notch cut in each of the flanges 18 and 20.

Upon making a circuit through the solenoid coil 48 each of the plungers 50 and 52 is withdrawn into the bore of the coil, thus functioning through the upper lever extremities of the arms 54 and 56 to expand the brake shoes 12 and 14. A spring 64 connects the two arms 54 and 56 and is of sufficient strength to cause the upper portions of said arms to bear at all times against the notched portions of the flanges 18 and 20.

Only one connecting wire is needed to supply current to the solenoid coil 48, one end of the coil being grounded at some convenient portion of the vehicle frame. The usual storage battery may furnish the current necessary for the operation of the solenoid.

It will be seen that when the solenoid is energized each of the plungers 50 and 52 will be drawn into the core of the solenoid with an equal amount of force. On the other hand, due to the servo action on such brake types, or the tendency to "wrap", there will be an unequal movement of the shoes from their normal centered position. That is to say, there will be a tendency for the entire brake shoe assembly to rotate in the direction of brake drum rotation until the assembly reaches a point where either one of the brake shoe flanges anchors against its corresponding supporting stud. But due to the fact that each of the plungers 50 and 52 is free to float axially through the core of the solenoid, so to speak, an equal force being transmitted to the arms 54 and 56 regardless of the axial position of said plungers in the core of the solenoid, an equal amount of force is transmitted through the arms 54 and 56 tending to expand the brake shoes 12 and 14 against the rotating drum 10.

It is apparent that my construction permits the application of the brake manually by operation of the brake applying arm 34 in the event of failure of the power means. It is apparent also, that the shoes 12 and 14 may be expanded simultaneously by means of the power device and the manual means.

Having illustrated a preferred form of my improved brake actuating mechanism various modifications will be apparent to those skilled in the art and for that reason I intend to limit myself only within the scope of the appended claims.

I claim:

1. Brake mechanism comprising, in combination, a rotatable drum, friction means floating within the drum having separable portions, operating means including a floating arm coupled with each portion to actuate the same, and power means coupled with each arm to exert equal effort thereon, each arm being movable independently of the other under power impulse to urge its separable portion of the friction means against the drum.

2. Brake mechanism comprising, in combination, a rotatable drum, friction means having separable ends arranged therein, a floating cam arranged between said ends to separate them, and floating lever mechanism engaging each of said ends inwardly of said cam to separate said ends.

3. Brake mechanism comprising, in combination, a rotatable drum, friction means having separable ends arranged therein, a floating cam arranged between said ends to separate them, and a pair of floating articulated levers arranged on opposite sides of said cam and engaging said ends to separate them.

4. Brake mechanism comprising, in combination, a rotatable drum, floating friction means arranged therein having separable portions and adapted to anchor upon one portion when the drum is rotating in one direction and upon the other portion when the drum is rotating in the opposite direction, floating power applying means arranged between said portions to expand them toward the drum, and auxiliary floating applying means arranged between said portions adapted to engage the same at points spaced from those engaged by first mentioned applying means to expand said friction means toward the drum.

5. Brake mechanism comprising a drum, floating friction means located within the drum having separable ends and adapted to anchor upon one end when the drum is rotating in one direction and upon the other end when the drum is rotating in the other direction, a power unit located within the drum coupled with said separable ends through applying mechanism bodily shiftable to permit said friction means to anchor upon either end and adapted to urge either end against the drum to wrap therewith independently of the other end.

6. Brake mechanism comprising a drum, floating friction means located within the drum having separable portions and adapted to anchor upon one portion when the drum is rotating in one direction and upon the other portion when the drum is rotating in the other direction, a power unit located within the drum and including floating operating mechanism coupled with said separable portions and shiftable to urge either portion against the drum to wrap therewith and to permit the other portion to remain anchored.

7. Brake mechanism comprising a drum, floating friction means located within the drum having separable portions and adapted to anchor upon one portion when the drum is rotating in one direction and upon the other portion when the drum is rotating in the other direction, manual operating means including floating applying mechanism coupled with said separable portions to urge both portions against the drum and bodily shiftable to permit one portion to wrap therewith while permitting the other portion to remain anchored, power operating means including floating applying mechanism coupled with said separable portions to urge both portions against the drum and bodily shiftable to permit one portion to wrap therewith while permitting the other portion to remain anchored.

8. Brake mechanism comprising a drum, floating friction means located within the drum having separable portions and adapted to anchor upon one portion when the drum is rotating in one direction and upon the other portion when the drum is rotating in the other direction, manual operating means including applying mechanism coupled with said separable portions and adapted to float with the shifting of anchorage of the friction means and operable to urge either portion against the drum to wrap therewith while permitting the other portion to remain anchored, power operating means including applying mechanism coupled with said separable portions radially inwardly of said manual operable floating applying mechanism adapted to float with the shifting of anchorage of the friction means and operable to urge both portions against the drum and to permit one portion to wrap therewith while permitting the other portion to remain anchored.

9. Brake mechanism comprising, in combination, a drum, a backing plate, floating friction means located within the drum having separable portions and adapted to shift circumferentially to anchor upon one portion when the drum is rotating in one direction and upon the other portion when the drum is rotating in the other direction, a power unit fixed to the backing plate within the drum, applying mechanism coupling the power unit with the friction means and responsive to the power unit to urge the friction means against the drum, said applying mechanism bodily shiftable in response to the circumferential anchoring movement of the friction means.

10. Brake mechanism comprising, in combination, a drum, a fixed support, friction means having separable ends supported within the drum to anchor on one end when the drum is rotating in one direction and on the other end when the drum is rotating in the opposite direction, a pair of floating levers each having one end thereof directly engaging one of said separable ends of the friction means operable to urge the friction means against the drum and each having the other end thereof adapted to be acted upon by brake operating mechanism, said levers pivotally connected with one another through a common floating pivot about which each may rock with respect to the other permitting said levers to be shifted together to follow the circumferential anchoring movement of said friction means.

11. Brake mechanism comprising, in combination, a drum, a fixed support, friction means having separable ends supported within the drum to anchor on one end when the drum is rotating in one direction and on the other end when the drum is rotating in the opposite direction, a pair of floating levers directly engaging said ends and operable to urge the friction means against the drum, said levers pivotally connected with one another through a common floating pivot about which each may rock with respect to the other, and brake operating mechanism coupled with said levers on the side of their common floating pivot opposite said separable ends to pivot the levers and spread the friction means into engagement with the drum, said levers being shiftable as a unit in response to the circumferential anchoring movement of the friction means and each lever being shiftable radially with respect to the other lever.

12. A brake comprising, in combination, a drum, a fixed support, friction means within the drum having one part which anchors on the support when the drum is turning in one direction and a different part which anchors on the support when the drum is turning in the other direction, a pair of power multiplying levers each having one end coupled with said friction means and the other end adapted to be acted upon by brake operating mechanism, and a floating pivotal connection between said levers intermediate their ends adapted to permit bodily movement of said levers to follow the anchoring movement of said friction means.

VINCENT G. APPLE.